US012359851B2

(12) United States Patent
Spangler et al.

(10) Patent No.: US 12,359,851 B2
(45) Date of Patent: Jul. 15, 2025

(54) THERMAL ENERGY STORAGE AND HEAT REJECTION SYSTEM (71) Applicants: Rolls-Royce Corporation, Indianapolis, IN (US); Rolls-Royce North American Technologies Inc., Indianapolis, IN (US)

(72) Inventors: Brian Thomas Spangler, Avon, IN (US); Douglas J. Snyder, Carmel, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 420 days.

(21) Appl. No.: 17/698,554

(22) Filed: Mar. 18, 2022

(65) Prior Publication Data

US 2022/0205691 A1 Jun. 30, 2022

Related U.S. Application Data (62) Division of application No. 16/058,445, filed on Aug. 8, 2018, now abandoned.
(Continued)

(51) Int. Cl.
*F25B 25/00* (2006.01)
*F25B 7/00* (2006.01)
*F25B 9/00* (2006.01)

(52) U.S. Cl.
CPC .............. *F25B 25/00* (2013.01); *F25B 7/00* (2013.01); *F25B 9/008* (2013.01); *F25B 2309/061* (2013.01)

(58) Field of Classification Search
CPC .......... F25B 7/00; F25B 25/00; F25B 25/005; F25B 2309/061; F25B 9/00; F25B 9/002; F25B 9/008
See application file for complete search history.

(56) References Cited

U.S. PATENT DOCUMENTS 4,727,930 A 3/1988 Bruckner et al.
5,170,639 A * 12/1992 Datta ........................ F25B 7/00
62/228.3
(Continued)

FOREIGN PATENT DOCUMENTS

CN 101893276 A 11/2010
WO WO 2008/112595 A1 9/2008

OTHER PUBLICATIONS

Extended European Search Report, dated Aug. 19, 2019, pp. 1-11, issued in European Patent Application No. 191625227, European Patent Office, Munich, Germany.

*Primary Examiner* — Tavia Sullens
(74) *Attorney, Agent, or Firm* — Barnes & Thornburg (57) ABSTRACT A cooling system is provided including a two-phase pump loop and a vapor compression system. The two-phase pump loop cools a thermal load with a first coolant. The vapor compression system is configured to circulate a second coolant. The vapor compression system includes a liquid vapor separator which separates the second coolant into a liquid portion and a gaseous portion. The liquid vapor separator is a thermal energy storage for the two-phase pump loop. A condenser of the two-phase pump loop transfers heat from the first coolant to the liquid portion of the second coolant in the liquid-vapor separator.

17 Claims, 9 Drawing Sheets

Related U.S. Application Data

(60) Provisional application No. 62/656,508, filed on Apr. 12, 2018.

(56) References Cited

U.S. PATENT DOCUMENTS

| | | |
|---|---|---|
| 5,386,709 A | 2/1995 | Aaron |
| 5,497,629 A | 3/1996 | Rafalovich et al. |
| 5,561,987 A | 10/1996 | Hartfield |
| 6,158,499 A | 12/2000 | Rhodes et al. |
| 7,096,679 B2 | 8/2006 | Manole |
| 7,905,110 B2 | 3/2011 | Reich et al. |
| 9,695,748 B2 | 7/2017 | Kreuger |
| 2007/0044494 A1 | 3/2007 | Ally et al. |
| 2008/0209941 A1 | 9/2008 | Narayanamurthy |
| 2010/0229576 A1* | 9/2010 | Mohs ................ F25D 16/00 62/305 |
| 2011/0083827 A1 | 4/2011 | Salyer |
| 2012/0060521 A1 | 3/2012 | Roetker et al. |
| 2014/0223933 A1 | 8/2014 | Steele |
| 2016/0076821 A1* | 3/2016 | Kopko ................ F25B 7/00 165/10 |
| 2016/0187014 A1* | 6/2016 | Becker ................ F25B 7/00 62/99 |
| 2016/0245558 A1 | 8/2016 | Feng et al. |
| 2017/0153049 A1 | 6/2017 | Kondo et al. |

\* cited by examiner

THERMAL ENERGY STORAGE AND HEAT REJECTION SYSTEM

CROSS REFERENCE

The present application is a divisional of co-pending U.S. Non-Provisional application Ser. No. 16/058,445, filed Aug. 8, 2018, which claims priority to U.S. Provisional Application No. 62/656,508, "Method and Apparatus of Heat Rejection with Refrigerant as Thermal Energy Source", filed Apr. 12, 2018. The contents of U.S. Non-Provisional application Ser. No. 16/058,445 and U.S. Provisional Application No. 62/656,508 are each incorporated by reference in their entirety.

TECHNICAL FIELD

This disclosure relates to cooling systems.

BACKGROUND

Some high energy applications produce demanding transient or prolonged thermal load. Frequently, equipment involved in such application must also be maintained at a steady operating temperature to avoid degraded performance. However, continuous cooling on such equipment often requires large and heavy refrigeration systems which cannot be easily transported. Additionally, some refrigeration systems cannot cool effectively in areas having high ambient temperatures, such as deserts.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The following description includes examples that are not intended to limit the present disclosure, application, or uses.

By way of an introductory example, a cooling system is provided including a two-phase pump loop and a vapor compression system. The two-phase pump loop cools a thermal load with a first coolant. The vapor compression system is configured to circulate a second coolant. The vapor compression system includes a liquid vapor separator which separates the second coolant into a liquid portion and a gaseous portion. The liquid vapor separator is a thermal energy storage for the two-phase pump loop. A condenser of the two-phase pump loop transfers heat from the first coolant to the liquid portion of the second coolant in the liquid-vapor separator.

One interesting feature of the systems and methods described below may be that the two-phase pump loop and the thermal energy storage may allow the cooling system to absorb heat from high energy applications to maintain equipment operating within a tight temperature tolerance. Alternatively, or in addition, an interesting feature of the systems and methods described below may be that the thermal energy storage and vapor compression system may allow the cooling system to reject heat generated by the operating equipment to the environment, even in high temperature ambient conditions. Alternatively, or in addition, an interesting feature of the systems and methods described below may be that the combination of the two-phase pump loop, the combined thermal energy storage and vapor compression system may decrease the size and weight of the cooling system compared to systems having a separate, additional thermal energy storage on a third fluid subsystem, allowing the cooling system to be more easily transportable. Alternatively, or in addition, an interesting feature of the systems and methods described below may be that thermal energy storage may allow the cooling system to effectively cool the operating equipment when there is a mismatch between the thermal load and the thermal mass of the two-phase pump loop. For example, in some embodiments, the operating equipment may create infrequent but large thermal loads which exceed the instant thermal mass of the two-phase pump loop. In such embodiments, the thermal energy storage may act as a "thermal magazine," allowing the two-phase pump loop, having a relatively small thermal mass, to quickly absorb the thermal load from the operating equipment and reject the heat to the thermal energy storage which has a relatively greater thermal mass. Such an embodiment may reduce the size of the cooling system.

Figure 1:
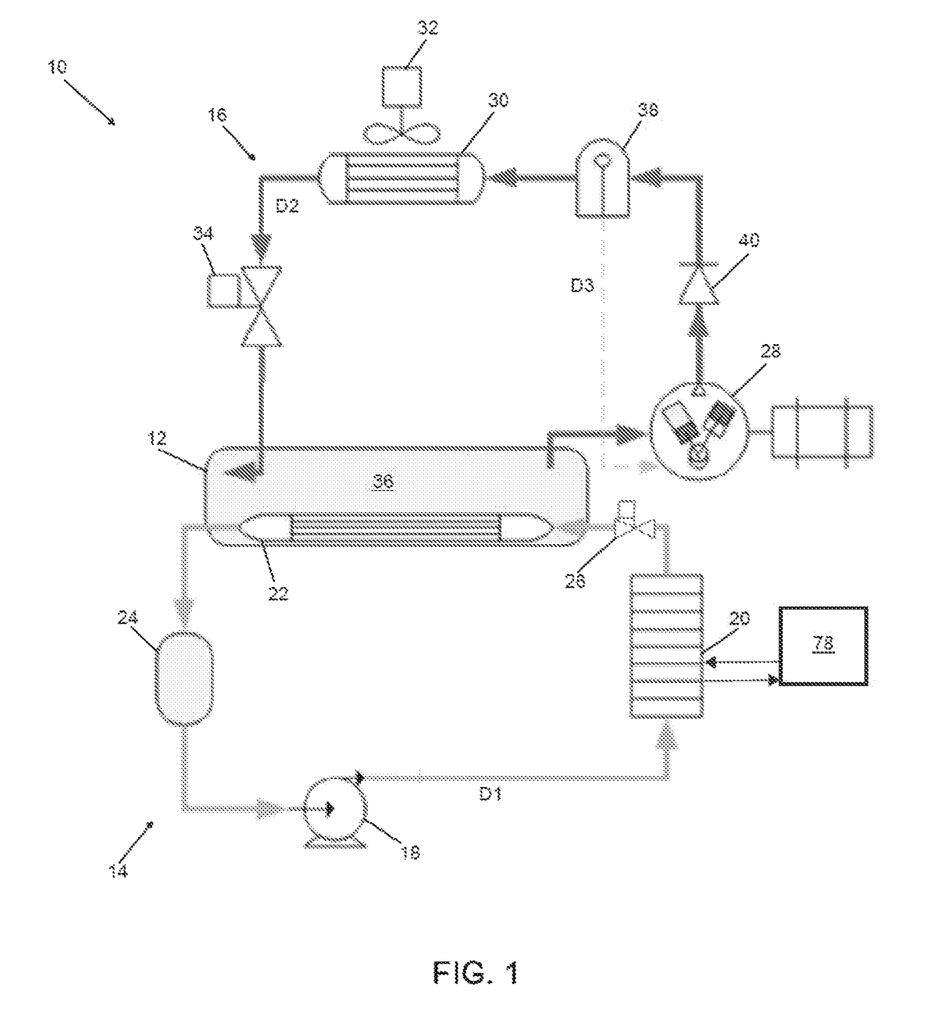
FIG. 1 illustrates a schematic diagram of a first example of a cooling system having a thermal energy storage.

FIG. 1 illustrates a schematic diagram of a cooling system 10 including a two-phase pump loop 14, a vapor compression system 16, and a thermal energy storage 12. The two-phase pump loop 14 may be any system which removes heat from a thermal energy source 78 and rejects thermal energy to the thermal energy storage 12. The two-phase pump loop 14 may be filled a first coolant (66 in FIG. 8) such as R-134a, R-717, R-744, or water. The two-phase pump loop 14 may have a direction of flow D1 from the pump 18 to the evaporator 20, then to the condenser 22, then to the accumulator 24, and then back to the pump 18.

The two-phase pump loop 14 may include a pump 18, an evaporator 20, a condenser 22, and an accumulator 24. The pump 18 may be any component in the two-phase pump loop 14 which supplies the first coolant 66 to the evaporator 20. Examples of the pump 18 may include a rotary pump, a reciprocating pump, or a linear positive displacement pump. The operation of the pump 18 may be controlled according to the cooling needs of the thermal energy source 78. The evaporator 20 may be any component which at least partially evaporates the liquid first coolant 66 supplied by the pump. Examples of the evaporator 20 may include a flooded evaporator or a direct expansion evaporator. The first coolant 66 passing through the evaporator 20 may cool a thermal load provided by a thermal energy source 78. The thermal energy source 78 may be any component which rejects heat to the evaporator 20 in order to be maintained at an operable temperature range. Examples of the thermal energy source 78 may be directed energy systems, electrical computing equipment, or other types of heat-producing machinery. The thermal energy source 78 may reject heat to the evaporator 20 through heat sinks submerged in the evaporator 20, or a by a convective heat exchanger.

The condenser 22 may be any device which receives the coolant evaporated by the evaporator 20. Examples of the condenser 22 may include a shell and tube heat exchanger, a straight tube heat exchanger, or a U-tube heat exchanger. The first coolant 66 entering the condenser 22 may be entirely gaseous, or may be a mixture of gas and liquid. At exiting the condenser 22, the first coolant 66 may be entirely liquid, or may be a mixture of gas and liquid having a smaller portion of gas than when entering the condenser 22. The accumulator 24 may be any component in which the liquid first coolant 66 may collect and supply first coolant 66 to the pump 18. Examples of the accumulator 24 may be a tank, a cylinder, or a tube. The accumulator 24 may contain a liquid portion of the first coolant 66 and a gaseous portion of the first coolant 66. The liquid portion of the first coolant 66 may be arranged to supply a head pressure to the pump 18 to prevent cavitation of the pump 18. The gaseous portion of the first coolant 66 cooled by the condenser 22 may condense in the accumulator 24.

The two-phase pump loop 14 may also contain a back pressure regulator 26 between the condenser 22 and the evaporator 20. The back pressure regulator 26 may be any device which controls the flow of the first coolant 66 from the evaporator 20 to the condenser 22. Examples of the back pressure regulator 26 may include a poppet valve, a check valve, or a pressure-sensing relief valve. The back pressure regulator 26 may maintain a constant pressure in the evaporator 20, ensuring adequate cooling of the thermal energy source 78. The back pressure regulator 26 may also ensure that the thermal energy source 78 is rejecting heat to the first coolant 66 in the evaporator 20 at a specific constant temperature. This may be a significant feature where the thermal energy source 78 is a high energy or directed-energy system. The back pressure regulator 26 may be directly or remotely controlled to accommodate for different cooling needs of the thermal energy source 78 and different operating condition of the pump 18.

The thermal energy storage 12 may be any component of the cooling system 10 which contains a second coolant and which supplies the second coolant to the condenser 22 of the two-phase pump loop 14 to cool the first coolant 66. Examples of the thermal energy storage 12 may include a tank, a drum, or a container. The second coolant contained within the thermal energy storage 12 may be any coolant such as R-134a, R-717, R-744, or water. The thermal energy storage 12 may operate as a vapor-liquid separator, such as a low pressure receiver, as the second coolant within the thermal energy storage 12 may be contained in both a liquid portion (50 in FIG. 8) and a gaseous portion (52 in FIG. 8) within a chamber 36 of the thermal energy storage 12. Examples of the chamber 36 may include a cavity or a space. As the first coolant 66 passes through the condenser 22, the liquid portion 50 of the second coolant is heated, eventually evaporating and adding to the gaseous portion 52 of the second coolant within the chamber 36 of the thermal energy storage 12.

In some embodiments, the thermal energy storage 12 and two-phase pump loop 14 may be arranged to maintain a temperature of the thermal energy source 78 within a narrow temperature range, for example between about 5-8 degrees Fahrenheit. Keeping the temperature of the thermal energy source 78 within such a narrow temperature range may be important to ensure adequate cooling of the thermal energy source 78. To ensure adequate cooling of the first coolant 66, the liquid portion 50 of the second coolant in the chamber 36 of the thermal energy storage 12 may be maintained at a temperature which is lower than the temperature of the first coolant 66 entering the condenser 22.

The vapor compression system 16 may be any system which cools the second coolant within the thermal energy storage 12. Examples of the vapor compression system 16 may include a sub-critical vapor compression system or a trans-critical vapor compression system. The vapor compression system 16 may include a compressor 28, a cooler 30, and an expansion valve 34. The vapor compression system 16 may have a direction of flow D2 from the thermal energy storage 12, to the compressor 28, then to the cooler 30, then to the expansion valve 34, and then back to the thermal energy storage 12.

In some embodiments, multiple vapor compression systems 16 may be fluidly coupled to the thermal energy storage 12. Each of the vapor compression systems 16 may be selectively activated or deactivated according to the cooling needs of the cooling system 10. Alternatively, in some embodiments, the vapor compression system 16 may have multiple compressors 28 and coolers 30 which may be selectively activated or deactivated according to the cooling needs of the thermal energy storage 12. The two-phase pump loop 14 may have a heat rejection capacity, the capacity for the two-phase pump loop 14 to absorb heat from the thermal energy source 78, which is greater than a cooling capacity of any of the individual vapor compressions systems 16. A total cooling capacity of the multiple vapor compression systems 16 may be greater than or equal to the heat rejection capacity of the two-phase pump loop 14, such that, when the thermal energy storage 12 may be maintained at a thermal equilibrium when the two-phase pump loop 14 and all of the vapor compressions systems 16 are operating.

Additionally, in some embodiments, multiple two-phase pump loops 14 may be in fluid connection with the thermal energy storage 12, such that the liquid portion 50 of the second coolant cools multiple two-phase pump loops 14. In such an embodiment, a cooling capacity of the vapor compression system 16 may be greater than or equal to a total heat rejection capacity of the multiple two-phase pump loops 14, such that, when the thermal energy storage 12 may be maintained at a thermal equilibrium when all of the two-phase pump loops 14 and the vapor compressions system 16 is operating. Other embodiments may include multiple two-phase pump loops 14 and multiple vapor compressions systems 16.

The compressor 28 may be any component which draws the gaseous portion 52 of the second coolant from the thermal energy storage 12 and supplies the second coolant to the cooler 30 at a higher pressure and a high temperature. Examples of the compressor may include a rotary compressor, a reciprocating compressor, a centrifugal compressor, or an axial compressor. The cooler 30 may be any container which cools the pressurized gaseous portion 52 of the second coolant supplied by the compressor 28. Examples of the cooler 30 may include a radiator, a serpentine tube, or a container shaped to maximize surface area over volume. The pressured gaseous portion 52 of the second coolant may be cooled in the cooler 30 by a gaseous cooling source 32. The gaseous cooling source 32 may be any gas which passes over the cooling to absorb heat from the gaseous portion 52 of the second coolant. Examples of the gaseous cooling source 32 may include a fan, a ventilator, or ambient atmospheric conditions.

The expansion valve 34 may be any component of the vapor compression system 16 which decreases the pressure of the gaseous portion 52 of the second coolant from the cooler 30. Examples of the expansion valve 34 may include an internally equalized thermal expansion valve or an externally equalized thermal expansion valve. The expansion valve 34 may be fluidly connected to the thermal energy storage 12 to return the cooled second coolant back to the chamber 36 of the thermal energy storage 12. As the pressure drops, the cooled gaseous portion 52 of the second coolant may partially or entirely condense while in the chamber 36 of the thermal energy storage 12.

The vapor compression system 16 may also include a check valve 40 between the compressor 28 and the cooler 30. The check valve 40 may be any component which prevents flow of the second coolant from flowing against the direction of flow D2 of the vapor compression system 16. Examples of the check valve 40 may include a ball check valve, a diaphragm check valve, or a swing check valve. The check valve 40 may be particularly useful to prevent backflow of the second coolant when the compressor 28 is not operating.

The vapor compression system 16 may also include an oil separator 38 positioned between the compressor 28 and the cooler 30. The oil separator 38 may be any component which removes oil from the gaseous portion 52 of the second coolant. Examples of the oil separator 38 may include a cylindrical filter, a conical filter, or filter sheet. The oil removed by the oil separator 38 may be returned to the compressor 28 along a direction of flow D3.

Figure 2:
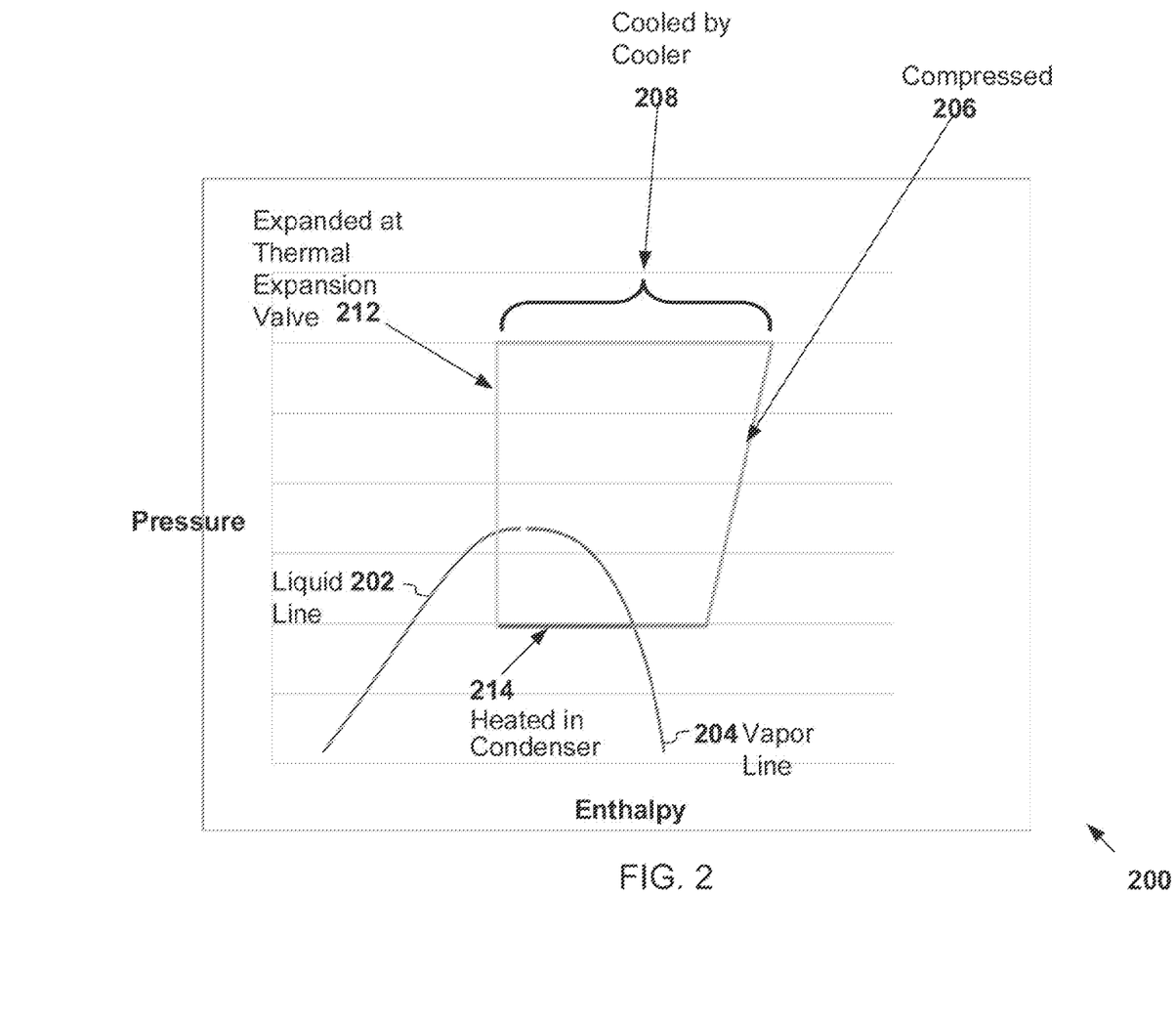
FIG. 2 is a pressure enthalpy diagram that illustrates an example of the progression of the pressure and enthalpy of a coolant as the coolant flows through a trans-critical vapor compression system.

FIG. 2 is a pressure-enthalpy diagram 200 that illustrates an example of the progression of the pressure and the enthalpy of the second coolant as the second coolant flows through the vapor compression system 16. The diagram 200 includes a liquid line 202 and a vapor line 204 for the second coolant used in the vapor compression system 16.

In the example illustrated in FIG. 2, the second coolant entering the compressor 28 may start as sub-critical superheated vapor. As the second coolant is compressed (206) by the compressor 28, the pressure and enthalpy of the second coolant increase. As the second coolant is cooled (208) by the cooler 30, the enthalpy of the second coolant decreases. The pressure of the second coolant drops below the liquid line 202 and/or the vapor line 204 when expanded (212) at expansion valve 34. This liquid portion 50 of the second coolant may return to the thermal energy storage 12. The heat of the first coolant 66 within the condenser 22 heats (214) the liquid portion 50 of the second coolant within the thermal energy storage 12 increasing the enthalpy of the second coolant. As the enthalpy of the second coolant increases by heating (214), a portion of the second coolant crosses the vapor line 204 and becomes a sub-critical superheated vapor. This gaseous portion 52 of the second coolant is then compressed (206) by the compressor 28, repeating the cycle.

Figure 3:
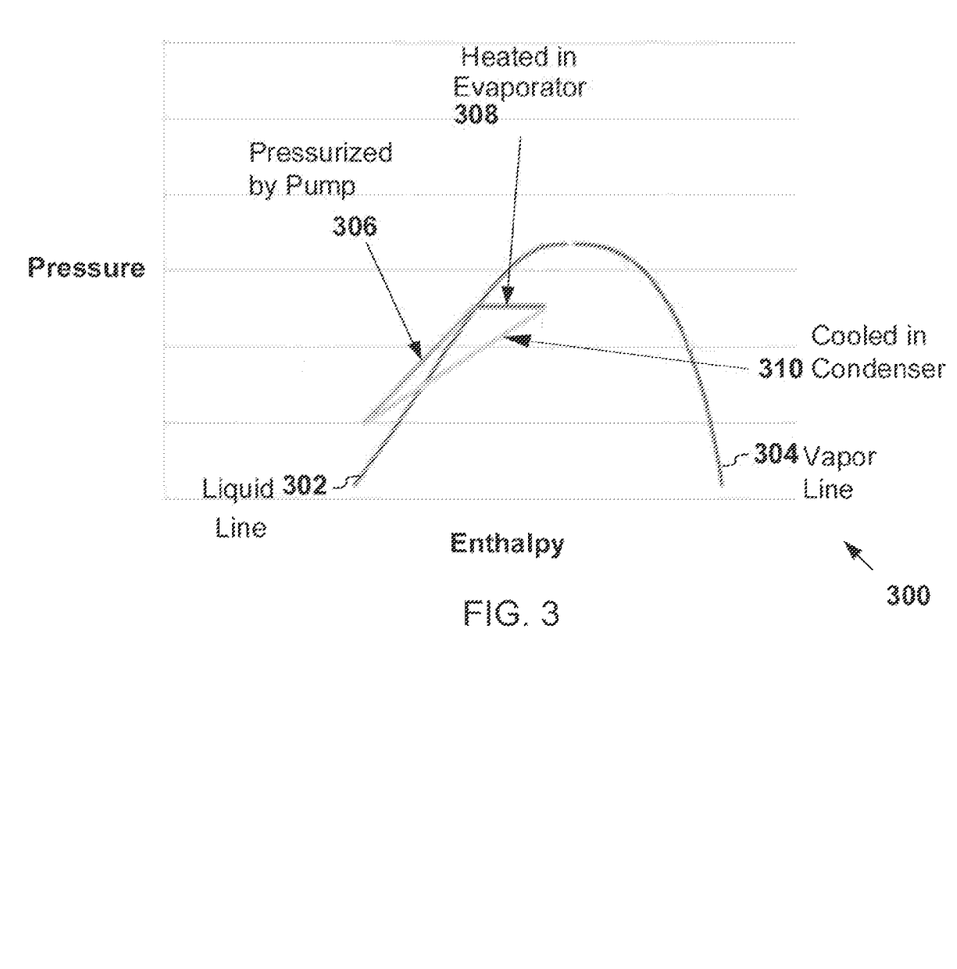
FIG. 3 is a pressure enthalpy diagram that illustrates an example of the progression of the pressure and enthalpy of a coolant as the coolant flows through a two phase pump two-phase pump loop.

FIG. 3 is a pressure-enthalpy diagram 300 that illustrates an example of the progression of the pressure and the enthalpy of the first coolant 66 as the first coolant 66 flows through the two-phase pump loop 14. The diagram 300 includes a liquid line 302 and a vapor line 304 for the second coolant used in the vapor compression system 16.

In the example illustrated in FIG. 3, the first coolant 66 entering the compressor 28 may start as sub-cooled liquid. As the first coolant 66 is pressurized (306) by the pump 18, the pressure and enthalpy of the first coolant 66 increase. The pressurization (306) of the first coolant 66 may raise the enthalpy and pressure to meet the liquid line 302. As the first coolant 66 heated (308) in the evaporator 20, the enthalpy of the first coolant 66 may increase toward the vapor line 304. The evaporator 20 may raise the enthalpy of the first coolant 66 to the vapor line 304, supplying a superheated vapor to the condenser 22. Alternatively, the evaporator 20 may raise the enthalpy of the first coolant 66 only partially to the vapor line 304, supplying a gas/liquid mixture to the condenser 22. As the first coolant 66 is cooled (310) within the condenser, the enthalpy of the first coolant 66 decreases. The pressure and enthalpy of the first coolant drop below the liquid line 302 as the first coolant 66 collects as a sub-cooled liquid in the accumulator 24. This sub-cooled liquid first coolant 66 may then be pressurized (306) by the pump 18, repeating the cycle.

Figure 4:
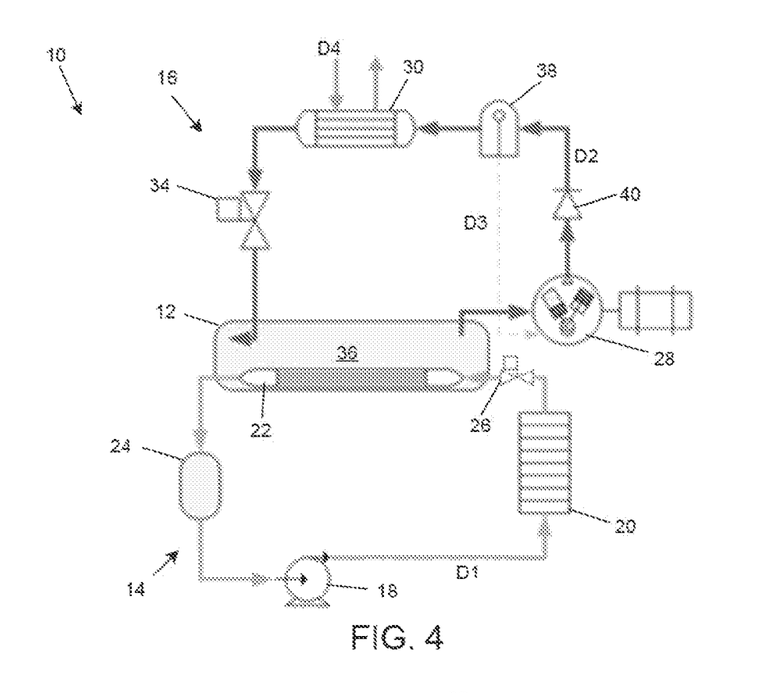
FIG. 4 illustrates a schematic diagram of a second example of a cooling system having a thermal energy storage.

FIG. 4 illustrates an alternative embodiment of the cooling system 10 having liquid cooling flow D4 for the cooler 30 in the vapor compression system 16. In some embodiments, the gaseous portion 52 of the second coolant in the cooler 30 may be cooled by through a flow of liquid D4 across the cooler 30. The flow of liquid D4 may be any liquid adequate to cool the second coolant in the cooler 30. For example, the flow of liquid D4 may be chilled water or sea water. A flow of liquid D4 over the cooler 30 may result in efficient cooling of the second coolant, but maintaining a supply for the flow of liquid D4 may increase the weight of the cooling system 10 and make the cooling system 10 less portable. However, particularly where the cooling system is used in a maritime setting, where a convenient flow of liquid D4 is always present, the flow of liquid D4 over the cooler 30 may provide an efficient method of cooling the second coolant in the cooler 30.

Figure 5:
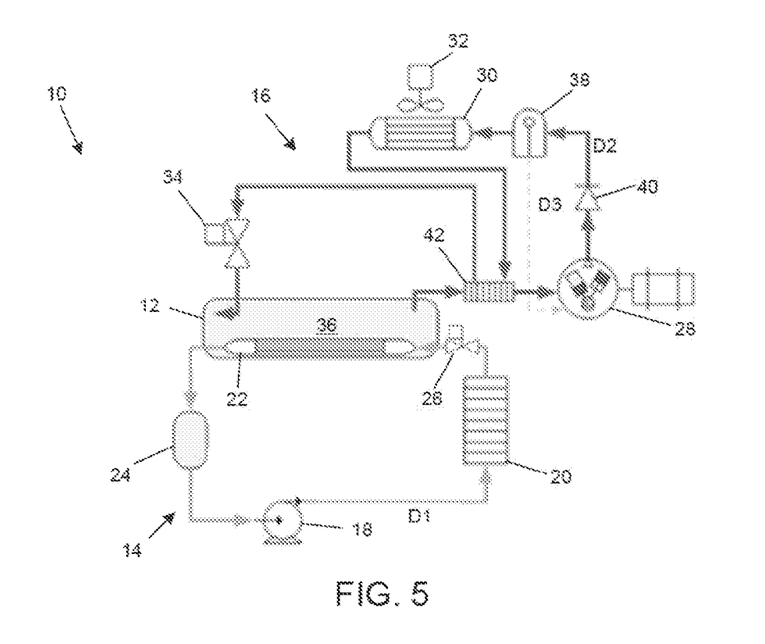
FIG. 5 illustrates a schematic diagram of a third example of a cooling system having a thermal energy storage.

FIG. 5 illustrates an alternative embodiment of the cooling system 10 incorporating a recuperator 42 into the vapor compression system 16. The recuperator 42 may be any component which uses the hot, high pressure second coolant from the cooler 30 to further heat the cool, low pressure gaseous portion 52 of the second coolant before it enter the compressor 28. Examples of the recuperator 42 may include a vertical flat panel recuperator, a horizontal flat panel recuperator, or a cellular recuperator. The recuperator 42 may be useful for supplementally heating the gaseous portion 52 of the second coolant to remove any remaining liquid elements from the second coolant before entering the compressor 28. The recuperator 42 may also be useful for supplementally cooling the second coolant exiting the cooler 30 before reaching the expansion valve 34. The flow of the second coolant through the recuperator 42 may increase the efficiency of the vapor compression system 16 if the temperature of the high pressure second coolant exiting the cooler 30 is hotter than the low pressure second coolant exiting the thermal energy storage 12.

Figure 6:
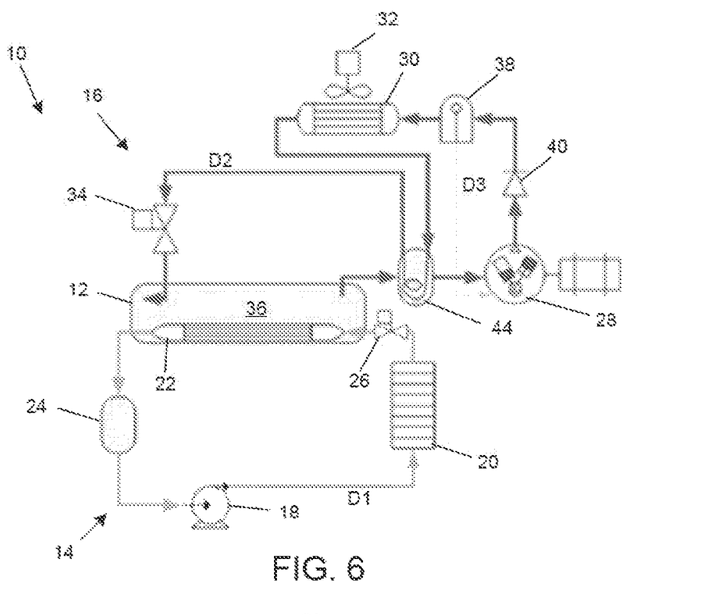
FIG. 6 illustrates a schematic diagram of a fourth example of a cooling system having a thermal energy storage.

FIG. 6 illustrates an alternative embodiment of the cooling system 10 incorporating a suction accumulator 44 into the vapor compression system 16. The suction accumulator 44 may be any component which removes any liquid from the cool, low pressure second coolant entering the compressor 28. Within the suction accumulator 44 hot, high pressure gas may boil any collected liquid in the second coolant headed to the compressor 28 to prevent excessive accumulation. A suction accumulator may be beneficial where the operator of the cooling loop is highly transient, such that the thermal energy storage 12 may not sufficiently separate the second coolant into a liquid portion 50 and a gaseous portion 52. The suction accumulator 44 may prevent damage to the compressor 28 by minimizing any liquid second coolant from entering the compressor 28.

Figure 7:
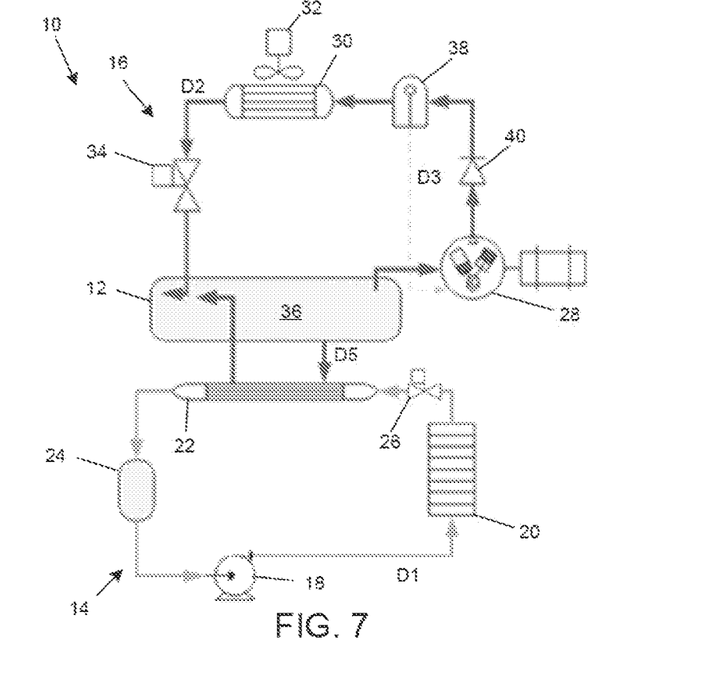
FIG. 7 illustrates a schematic diagram of a fifth example of a cooling system having a thermal energy storage.

FIG. 7 illustrates an alternative embodiment of the cooling system 10 arranged such that the condenser 22 is located outside the thermal energy storage 12. Flow of the second coolant D5 between the thermal energy storage 12 and the condenser 22 may be utilized to cool the first coolant 66 in the condenser 22. In some embodiments, the flow D5 of the liquid portion 50 of the second coolant from the thermal energy storage 12 to the condenser 22 may be gravity fed. For example, the liquid portion 50 of the second coolant may descend through a conduit or pipe to the condenser 22. In such an embodiment, the liquid portion 50 of the second coolant may remain in the condenser 22 until evaporating, adding to the gaseous portion 52 of the second coolant upon returning to the thermal energy storage 12.

Figure 8:
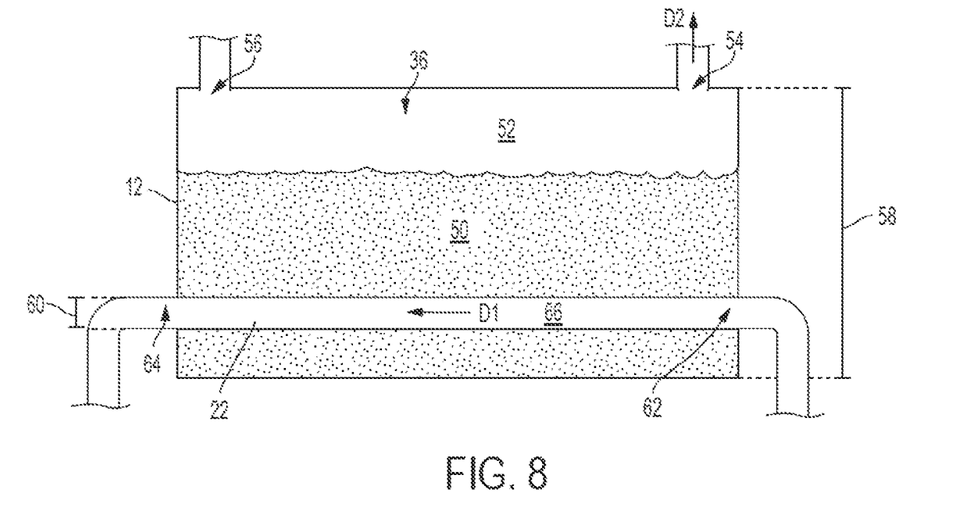
FIG. 8 illustrates a cross-sectional side view of an example of a thermal energy storage.

FIG. 8 illustrates cross-sectional view of an alternative embodiment of the thermal energy storage 12 having the condenser 22 passing through the chamber 36 of the thermal energy storage 12. In such an embodiment, the liquid portion 50 of the second coolant resting at the bottom of the chamber 36 cools the first coolant 66. As the second coolant is heated and evaporates, it rises to add to the gaseous portion 52 at the top of the chamber 36. An outlet 54 of the thermal energy storage 12 allows the gaseous portion 52 to flow D2 to the compressor. An inlet 56 of the thermal energy storage 12 allows the second coolant to flow D2 from the expansion valve and add to the liquid portion 50 of the second coolant in the chamber 36. The first coolant 66 enters the chamber 36 at inlet 62 of the condenser 22 and exits the chamber 36 at an outlet 64 of the condenser 22.

The thermal energy storage may have a diameter 58 which is larger than a corresponding diameter 60 of the portion of the condenser 22 carrying the first coolant 66. The difference in diameters 58, 60 corresponds to the second coolant within the thermal energy storage 12 having a volume which is greater than the first coolant 66 within the condenser 22. In some embodiments, the volume of second coolant within the thermal energy storage 12 may be between 50 and 150 times greater than the volume of first coolant 66 within the condenser 22. The difference in volumes allows the thermal energy storage 12 to cool the first coolant 66 over many cycles of the two-phase pump loop 14 even where the vapor compression system 16 is not operating. In some embodiments, the vapor compression system 16 may be detached from the thermal energy storage 12 at the inlet 56 and outlet 54 of the thermal energy storage 12. In such embodiments, the thermal energy storage 12 may still be operable even when the vapor compression system 16 is detached. The vapor compression system 16 may be reattached and operated to cool the liquid portion 50 of the second coolant within the thermal energy storage 12.

Figure 9:
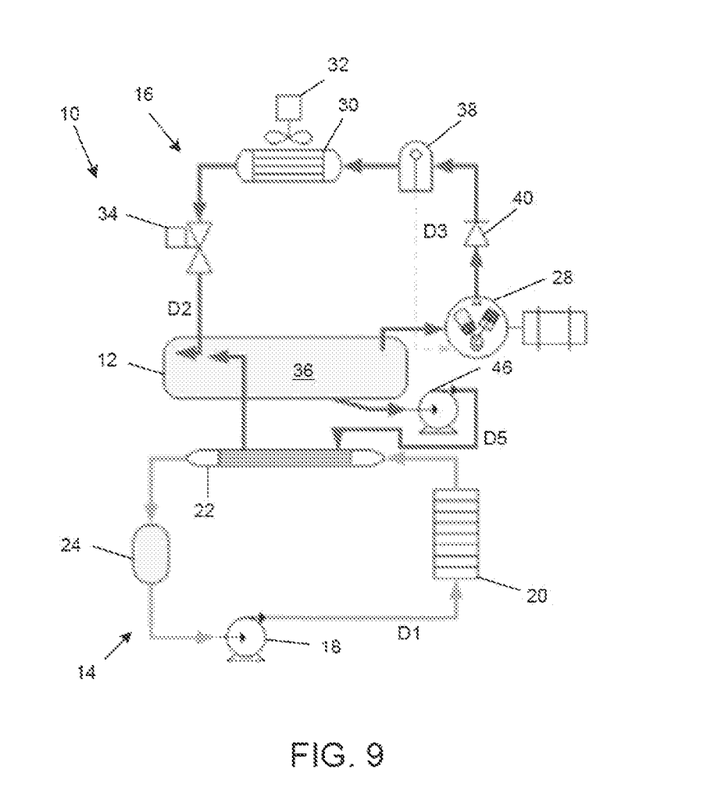
FIG. 9 illustrates a schematic diagram of a sixth example of a cooling system having a thermal energy storage.

FIG. 9 illustrates an alternative embodiment of the cooling system 10 having a second coolant pump 46 arranged to pump the liquid portion 50 of the second coolant from the thermal energy storage 12 through the condenser 22 positioned outside the chamber 36 of the thermal energy storage 12. The second coolant pump 46 may be used to allow variable movement of the second coolant through the condenser 22 and back to the thermal energy storage 12. As a result, the second coolant re-entering the thermal energy storage 12 may be a mixture of gas and liquid. The use of the second coolant pump 46 may allow variability along the flow path D5 such that heat transfer from the condenser 22 may be closely controlled. Such a configuration may improve control over pressure and temperature of the first coolant 66 within the two-phase pump loop 14.

Figure 10:
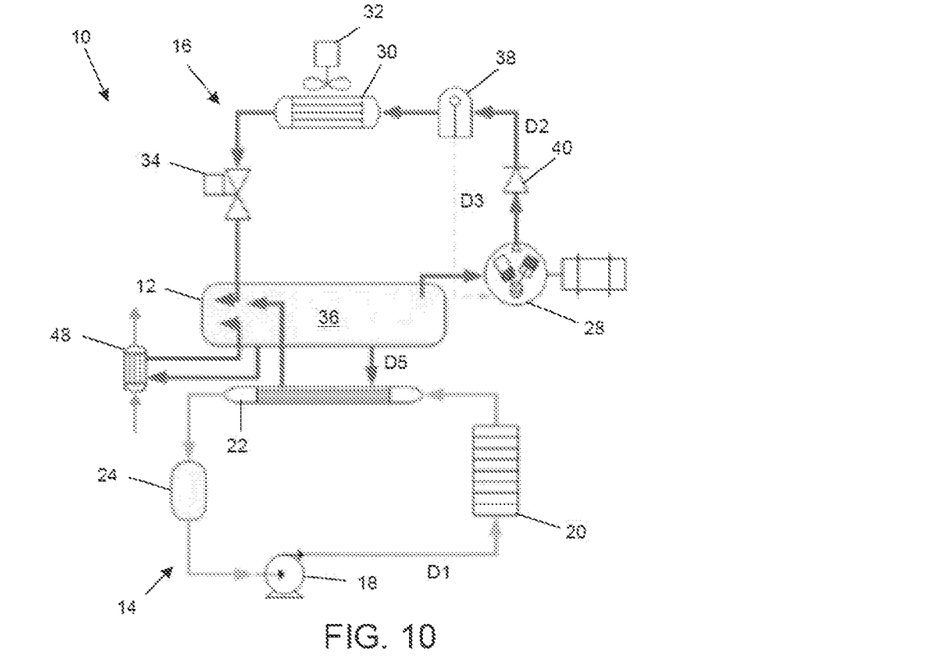
FIG. 10 illustrates a schematic diagram of a seventh example of a cooling system having a thermal energy storage.

FIG. 10 illustrates an alternative embodiment of the cooling system 10 having additional thermal loads 48 which are cooled by the liquid portion 50 of the second coolant from the thermal energy storage 12. The additional thermal loads 48 may be any thermal energy source which requires cooling. For example, the additional thermal loads 48 may include housekeeping loads from cooling the pump 18 of the two-phase pump loop 14, cooling an electrical control system for the cooling system 10, cooling the compressor 28, or any other loads associated with thermal energy source 78 that require cooling at a different flow rate than what is provided by the two-phase pump loop 14.

Figure 11:
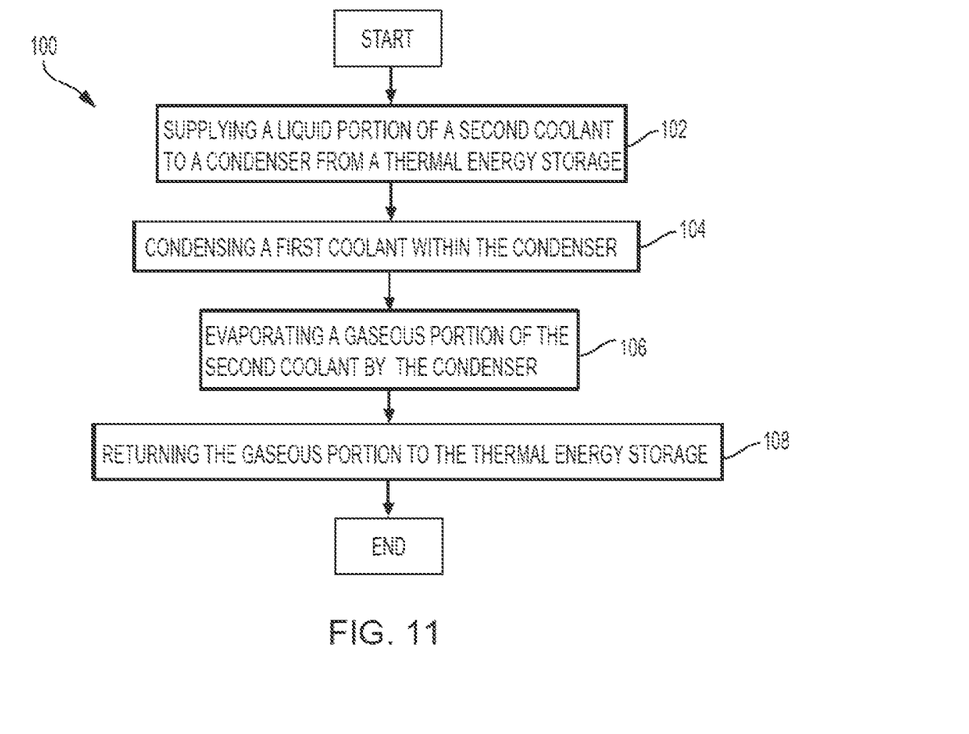
FIG. 11 illustrates a flow diagram of an example of a method of manufacturing a combustor liner.

FIG. 11 illustrates a flow diagram of an example of a method of operating the cooling system 10 (100). The steps may include additional, different, or fewer operations than illustrated in FIG. 11.

The method (100) includes supplying the liquid portion 50 of second coolant to the condenser 22 from the thermal energy storage 12 (102). The method (100) may also include condensing the first coolant 66 within the condenser 22 (104) and evaporating the gaseous portion 52 of the second coolant by the condenser 22 (106). The method (100) may also include returning the gaseous portion 52 of the second coolant to the thermal energy storage 12 (108).

The method (100) may be implemented with additional, different, or fewer components. For example, in some embodiments, the vapor compression system 16 may not be continuously operational. Instead, the method (100) may include operating the vapor compression system 16 when the liquid portion 50 of the second coolant within the chamber 36 of the thermal energy storage 12 reaches a predetermined temperature. Alternatively, in some embodiments, the two-phase pump loop 14 may not be continuously operational. Accordingly, the method (100) may include operating the vapor compression system 16 when the two-phase pump loop 14 is not being operated. Alternatively, the method (100) may include operating the two-phase pump loop 14 and operating the vapor compression system 16 simultaneously to maintain a constant temperature in the thermal energy storage 12. The method (100) may also include supplying the second coolant to the condenser 22 by a second coolant pump 46.

Figure 12:
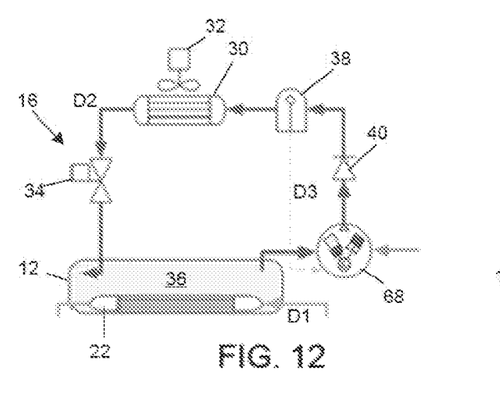
FIG. 12 illustrates a schematic diagram of a first example of a vapor compression system having a thermal energy storage.
Figure 13:
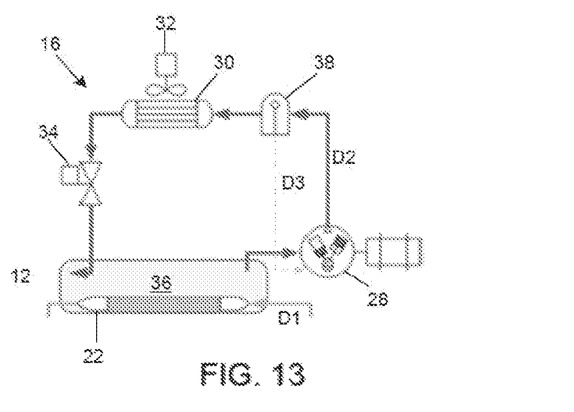
FIG. 13 illustrates a schematic diagram of a second example of a vapor compression system having a thermal energy storage.
Figure 14:
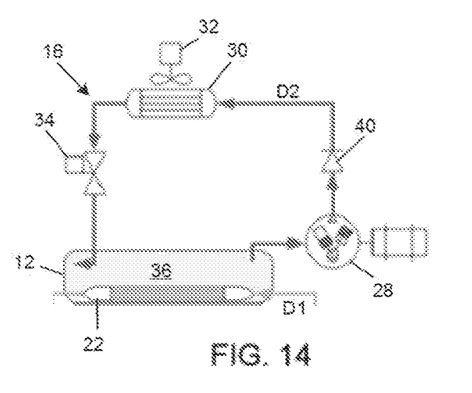
FIG. 14 illustrates a schematic diagram of a third example of a vapor compression system having a thermal energy storage.
Figure 15:
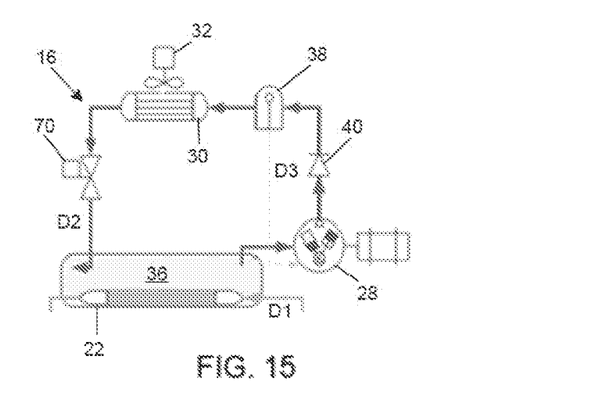
FIG. 15 illustrates a schematic diagram of a fourth example of a vapor compression system having a thermal energy storage.
Figure 16:
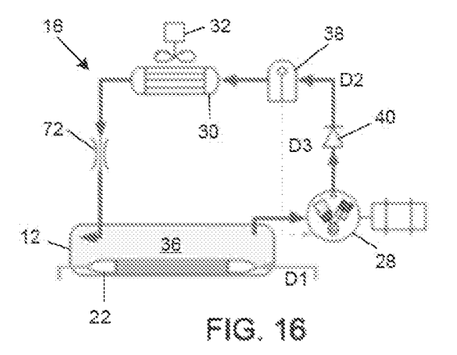
FIG. 16 illustrates a schematic diagram of a fifth example of a vapor compression system having a thermal energy storage.
Figure 17:
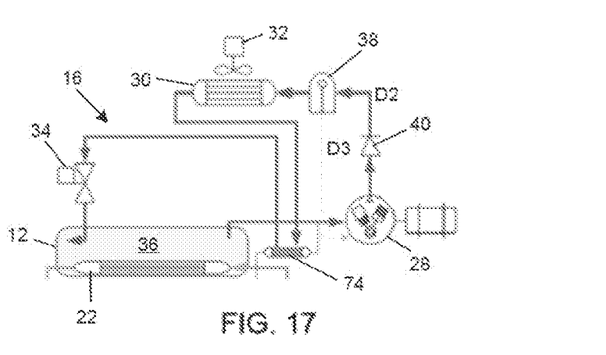
FIG. 17 illustrates a schematic diagram of a sixth example of a vapor compression system having a thermal energy storage.
Figure 18:
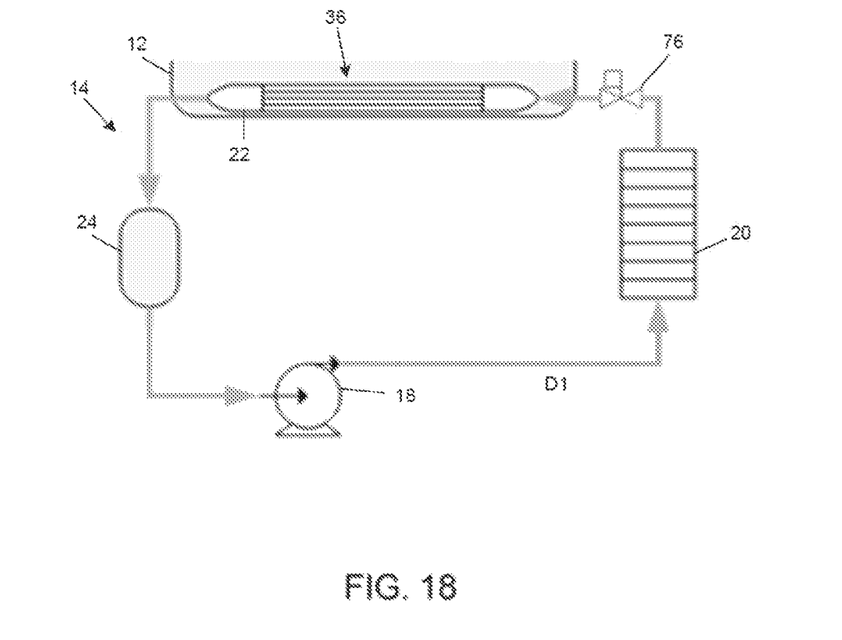
FIG. 18 illustrates a schematic diagram of an example of a two-phase pump loop passing through a thermal energy storage.

Each component may include additional, different, or fewer components. For example, FIG. 12 illustrates an embodiment of the vapor compression system 16 having the compressor 28 which is mechanically driven, which could also be driven by an electric motor. FIG. 13 illustrates an embodiment of the vapor compression system 16 without the check valve 40, which may not be necessary when the vapor compression system 16 is arranged such that liquid second coolant will not flow from the cooler 30 back into the compressor 28. FIG. 14 illustrates an embodiment of the vapor compression system 16 without the oil separator 38 which may be used if oil carryover from the compressor 28 is sufficiently low. FIG. 15 illustrates an embodiment of the vapor compression system 16 having a back pressure regulator 70 instead of the expansion valve 34. FIG. 16 illustrates an embodiment of the vapor compression system 16 having a fixed orifice 72 instead of the expansion valve 34. FIG. 17 illustrates an embodiment of the vapor compression system 16 having an oil rectifier 74 positioned between the cooler 30 and the expansion valve 34 to ensure sufficient oil return to the compressor 28. FIG. 18 illustrates an embodiment of the two-phase pump loop 14 having a control valve 76 instead of a back pressure regulator 26.

Figure 19:
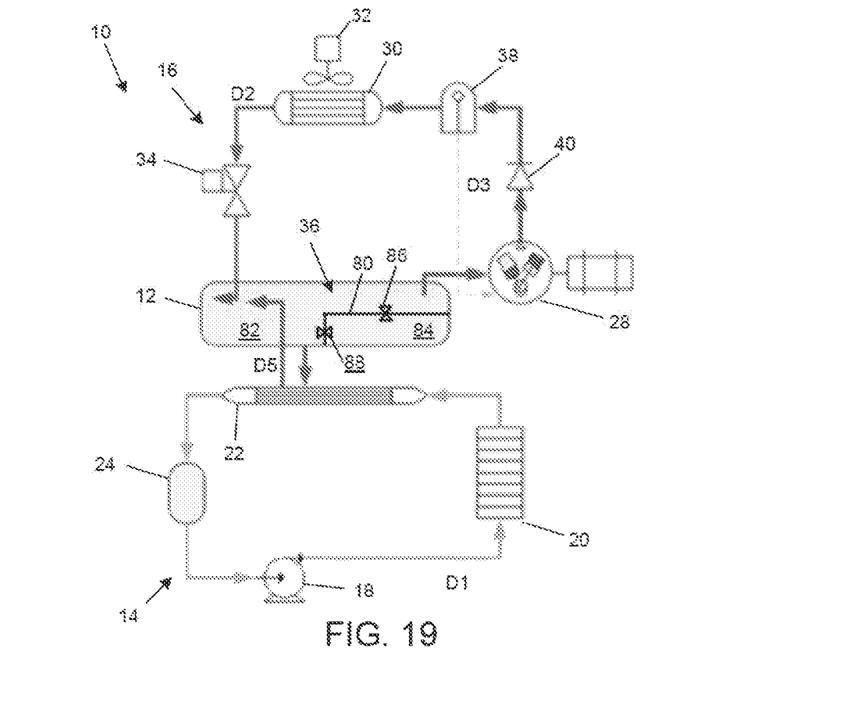
FIG. 19 illustrates a schematic diagram of an eighth example of a cooling system having a thermal energy storage.

FIG. 19 illustrates an alternative embodiment of the cooling system having container 80 sequestering a volume 84 of the liquid portion 50 of the second coolant. The container 80 may be any object which can hold and sequester the liquid portion 50 of the second coolant, such as a vessel or a subchamber of the chamber 36 of the thermal energy storage 12 divided by a barrier from the rest of the chamber 36. The container 80 may be located inside or outside the chamber 36 of the thermal energy storage 12. The container 80 may be fluidly coupled to the chamber 36 of the thermal energy storage 12 by an inlet valve 88 and an outlet valve 86.

In some embodiments, the two phase pump loop 14 may operate without the vapor compression system 16. In such situations, the temperature of the second coolant may steadily increase as heat is rejected from the first coolant 66. To restore the cooling capacity of the thermal energy storage 12 and to continue cooling the two-phase pump loop 14, the vapor compression system 16 may be restarted by operating the compressor 28. However, in embodiments where the vapor compression 16 is relatively small compared to the thermal energy storage 12, operating the vapor compression system 16 may cause the temperature of the large quantity of the liquid portion 50 of the second coolant to decline slowly. Instead, a volume 84 of the liquid portion 50 of the second coolant may be sequestered within the container 80 before operating the compressor 28. In such an embodiment, the vapor compression system 16 may initially cool only the unsequestered second coolant in the chamber 36. This would allow the vapor compression system 16 and two-phase pump loop 14 to more quickly cool the unsequestered second coolant to the required operating temperatures.

Once the steady state operating condition is reached, the vapor compression system 16 could continue with the cooling of the sequestered second coolant to the operating temperature and then to continue cooling all the second coolant to a temperature necessary to provide sufficient thermal storage capacity. The sequestered second coolant may be at a higher temperature than the unsequestered coolant, such that opening of the outlet valve 86 may cause the sequestered coolant to contribute to the gaseous portion 52 of the second coolant in the thermal energy storage 12. Opening of the inlet valve 88 may cause the unsequestered coolant to mix with the sequestered coolant, lowering the temperature of the sequestered volume 84 of the second coolant. In order to avoid unnecessary heat exchange between the sequestered volume 84 of the second coolant and the unsequestered second coolant, the container 80 may be insulated.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A cooling system comprising:
   a two-phase pump loop comprising a pump, an evaporator configured to evaporate a first coolant supplied by the pump, a condenser configured to condense the first coolant evaporated by the evaporator, and an accumulator configured to deliver the first coolant condensed in the condenser to the pump;
   a thermal energy storage configured to deliver a liquid portion of a second coolant to the condenser of the two-phase pump loop, wherein the thermal energy storage is configured to separate the second coolant into the liquid portion and a gaseous portion; and
   a vapor compression system configured to circulate the second coolant, the vapor compression system comprising a compressor and a cooler, wherein the thermal energy storage is configured as a liquid-vapor separator of the vapor compression system, the compressor is configured to compress the gaseous portion of the second coolant from the thermal energy storage, and the cooler is configured to cool the gaseous portion compressed by the compressor.

2. The cooling system of aspect 1, wherein the vapor compression system is a trans-critical vapor compression system.

3. The cooling system of either of aspects 1 to 2, wherein the vapor compression system is detachable from the thermal energy storage, and wherein the thermal energy storage is still operable while vapor compression system is detached.

4. The cooling system of any of aspects 1 to 3, wherein the two-phase pump loop has a heat rejection thermal mass which is greater than or equal to a cooling capacity of the vapor compression system.

5. The cooling system of any of aspects 1 to 4, wherein the condenser of the two-phase pump loop is positioned within a chamber of the thermal energy storage containing the second coolant.

6. The cooling system of any of aspects 1 to 5, wherein the condenser of the two-phase pump loop is external to the thermal energy storage.

7. The cooling system of aspect 1 to 6, further comprising a second pump configured to supply the second coolant from the thermal energy storage to the condenser of the two-phase pump loop.

8. The cooling system of any of aspects 1 to 7, wherein a volume of the second coolant in the thermal energy storage is greater than a volume of the first coolant in the condenser 9. The cooling system of any of aspects 1 to 8, wherein the thermal energy storage comprises a container configured to sequester a volume of the liquid portion of the second coolant from the vapor compression system.

10. A cooling system comprising:
    a two-phase pump loop configured to cool a thermal load with a first coolant; and
    a vapor compression system configured to circulate a second coolant, the vapor compression system comprising a liquid-vapor separator configured to separate the second coolant into a liquid portion and a gaseous portion,
    wherein the liquid-vapor separator is a thermal energy storage for the two-phase pump loop, wherein a condenser of the two-phase pump loop is configured to transfer heat from the first coolant to the liquid portion of the second coolant in the liquid-vapor separator.

11. The cooling system of aspect 10, wherein the evaporator is heated by a thermal energy source and wherein the two-phase pump loop and the thermal energy storage are configured to maintain the thermal energy source within a temperature range of 5 degrees Fahrenheit.

12. The cooling system of any of aspects 10 to 11, comprising a housekeeping cooling loop comprising a condenser cooled by the second coolant from the thermal energy storage.

13. The cooling system of any of aspects 10 to 12, wherein the vapor compression system comprises a plurality of independently operable compressors.

14. The cooling system of any of aspects 10 to 13, wherein the cooler of the vapor compression system is an open seawater cooler.

15. The cooling system of any of aspects 10 to 14, wherein the cooler of the vapor compression system is an air cooler operating at an ambient temperature.

16. A method comprising:
    supplying a liquid portion of a second coolant to a condenser from a thermal energy storage;
    condensing a first coolant within the condenser, wherein the first coolant is in a two-phase pump loop and the first coolant is cooled by the liquid portion of the second coolant passing through the condenser;
    evaporating a gaseous portion of the second coolant by the condenser; and
    returning the gaseous portion of the second coolant to the thermal energy storage, wherein the gaseous portion of the second coolant within the thermal energy storage is configured to supply a vapor compression system.

17. The method of aspect 16, comprising selectively operating the vapor compression system when the liquid portion of the second coolant within the thermal energy storage reaches a predetermined temperature.

18. The method of any of aspects 16 to 17, comprising operating the vapor compression system while the two-phase pump loop is not being operated.

19. The method of any of aspects 16 to 18, comprising operating the two-phase pump loop and operating the vapor compression system simultaneously to maintain a constant temperature in the thermal energy storage.

20. The method of any of aspects 16 to 19, wherein the second coolant is supplied to the condenser by a pump.

What is claimed is:

1. A cooling system comprising:
    a two-phase pump loop comprising a pump, an evaporator configured to evaporate a first coolant supplied by the pump, a condenser configured to condense the first coolant evaporated by the evaporator, and an accumulator configured to deliver the first coolant condensed in the condenser to the pump;
    a thermal energy storage configured to deliver a liquid portion of a second coolant to the condenser of the two-phase pump loop, wherein the thermal energy storage is configured to separate the second coolant into the liquid portion and a gaseous portion;
    a vapor compression system configured to circulate the second coolant, the vapor compression system comprising a compressor and a cooler, wherein the thermal energy storage is configured as a liquid-vapor separator of the vapor compression system, the compressor is configured to compress the gaseous portion of the second coolant from the thermal energy storage, and the cooler is configured to cool the gaseous portion compressed by the compressor, and
    a first conduit extending from the thermal energy storage to the condenser; and
    a second conduit extending from the condenser to the thermal energy storage,
    wherein the two-phase pump loop is external to the thermal energy storage, the first conduit configured to the deliver a flow of the second coolant from the thermal energy storage to the condenser to cool the first coolant, and the second conduit configured to deliver the flow of the second coolant from the condenser to the thermal energy storage.

2. The cooling system of claim 1, wherein the vapor compression system is a trans-critical vapor compression system.

3. The cooling system of claim 1, wherein the two-phase pump loop has a heat rejection capacity which is greater than or equal to a cooling capacity of the vapor compression system.

4. The cooling system of claim 1, further comprising a second pump disposed along the first conduit between thermal energy storage and the condenser, the second pump configured to supply the second coolant from the thermal energy storage to the condenser of the two-phase pump loop.

5. The cooling system of claim 4, wherein the second pump is further configured to cause variable movement of the second coolant through the condenser and back to the thermal energy storage.

6. The cooling system of claim 5, wherein the second pump is further configured to supply a mixture of the liquid portion of the second coolant and the gaseous portion of the second coolant to the thermal energy storage in response to the variable movement.

7. The cooling system of claim 1, wherein a volume of the second coolant in the thermal energy storage is greater than a volume of the first coolant in the condenser.

8. The cooling system of claim 1, wherein the thermal energy storage comprises a container configured to sequester a first volume of the second coolant from the vapor compression system, the second coolant further comprising a second volume unsequestered by the container.

9. The cooling system of claim 8, wherein the vapor compression system is configured to: initially cool the second volume of the second coolant unsequestered by the container before a steady state operating condition is reached; and cool the first volume sequestered by the container when the steady state operating condition is reached.

10. The cooling system of claim 8, wherein the container is configured to sequester the first volume at a first temperature that is higher than a second temperature of the second volume, and wherein the cooling system further comprises a valve that, when opened, is configured to cause the first volume and the second volume to mix to lower the first temperature of the first volume.

11. The cooling system of claim 1, wherein the cooler of the vapor compression system is an open seawater cooler.

12. The cooling system of claim 1, wherein the cooler of the vapor compression system is an air cooler operating at an ambient temperature.

13. The cooling system of claim 1, wherein the condenser is configured to: evaporate the liquid portion of the second coolant to produce a portion of the gaseous portion of the second coolant; and supply the portion of the gaseous portion to the thermal energy storage.

14. The cooling system of claim 1, wherein the thermal energy storage is configured to cool a thermal load with the liquid portion of the second coolant.

15. The cooling system of claim 14, wherein the thermal load comprises a first thermal load, and wherein the two-phase pump loop is configured to cool a second thermal load with the first coolant.

16. The cooling system of claim 15, wherein the thermal energy storage is configured to cool the first thermal load with a first flow rate that is different than a second flow rate with which the two-phase pump loop is configured to cool the second thermal load.

17. A cooling system comprising:
a two-phase pump loop configured to cool a thermal load with a first coolant, the two-phase pump loop comprising a condenser;
a vapor compression system configured to circulate a second coolant, the vapor compression system comprising a liquid-vapor separator configured to separate the second coolant into a liquid portion and a gaseous portion,
a first conduit extending from the liquid-vapor separator to the condenser; and
a second conduit extending from the condenser to the liquid-vapor separator,
wherein the liquid-vapor separator is a thermal energy storage for the two-phase pump loop, the condenser is positioned external to the thermal energy storage, the thermal energy storage is configured to supply the liquid portion of the second coolant to the condenser of the two-phase pump loop, and wherein the condenser of the two-phase pump loop is configured to transfer heat from the first coolant to the liquid portion of the second coolant, the first conduit configured to the deliver a flow of the liquid portion of the second coolant from the liquid-vapor separator to the condenser to cool the first coolant, and the second conduit configured to deliver the flow of the second coolant from the condenser to the liquid-vapor separator; wherein the two-phase pump loop comprises an evaporator that is heated by the thermal load and wherein the two-phase pump loop and the thermal energy storage are configured to maintain the thermal load within a temperature range of 5 degrees Fahrenheit.

* * * * *